United States Patent
Robinson-Morgan et al.

(10) Patent No.: US 12,306,915 B2
(45) Date of Patent: May 20, 2025

(54) SYSTEMS AND METHODS FOR USE IN IMPLEMENTING SELF-SOVEREIGN CREDENTIALS

(71) Applicant: MASTERCARD INTERNATIONAL INCORPORATED, Purchase, NY (US)

(72) Inventors: Bryn Anthony Robinson-Morgan, Mosborough Village (GB); Liang Tian, Rye Brook, NY (US); Prashant Sharma, Madison, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 127 days.

(21) Appl. No.: 17/899,506

(22) Filed: Aug. 30, 2022

(65) Prior Publication Data

US 2023/0073938 A1 Mar. 9, 2023

Related U.S. Application Data

(60) Provisional application No. 63/238,996, filed on Aug. 31, 2021.

(51) Int. Cl.
*H04L 9/08* (2006.01)
*G06F 21/31* (2013.01)
(Continued)

(52) U.S. Cl.
CPC ............ *G06F 21/31* (2013.01); *H04L 9/0847* (2013.01); *H04L 9/30* (2013.01); *H04L 9/3247* (2013.01)

(58) Field of Classification Search
CPC ......... G06F 21/31; H04L 9/0847; H04L 9/30; H04L 9/3247; H04L 9/321; H04L 9/50;
(Continued)

(56) References Cited

U.S. PATENT DOCUMENTS 9,853,977 B1 12/2017 Laucius et al.
10,554,416 B1 2/2020 Yavuz
(Continued)

FOREIGN PATENT DOCUMENTS

EP 2953079 12/2015
EP 2953079 A1 12/2015 ............. G06F 21/00
(Continued)

OTHER PUBLICATIONS

Digital Identities and Verifiable Credentials, by Fridgen et al., published 2020. (Year: 2020).*
(Continued)

*Primary Examiner* — Vu V Tran
(74) *Attorney, Agent, or Firm* — Harness, Dickey & Pierce, P.L.C.

(57) ABSTRACT

Systems and methods are provided for using verifiable credentials. One example computer-implemented method includes receiving, by an identity provider (IDP) computing device, an identity request from a relying party and directing the request to a user of an application at a mobile device associated with the user, where the mobile device includes a verifiable credential. The method also includes receiving, by the IDP computing device, from the mobile device, the verifiable credential, verifying the verifiable credential based on a public key associated with an issuer of the verifiable credential, and transmitting a link and a first authorization of the verifiable credential to the relying party. The method further includes receiving, by the IDP computing device, a request for identity data from the relying party including a second authorization and, in response to the first authorization matching the second authorization, returning the identity data to the relying party.

14 Claims, 6 Drawing Sheets

(51) Int. Cl.
  *H04L 9/00* (2022.01)
  *H04L 9/30* (2006.01)
  *H04L 9/32* (2006.01)
  *H04W 12/06* (2021.01)
  *H04W 12/084* (2021.01)

(58) Field of Classification Search
  CPC ............ H04L 2209/80; H04W 12/084; H04W 12/068
  See application file for complete search history.

(56) References Cited

U.S. PATENT DOCUMENTS

| | | | |
|---|---|---|---|
| 10,685,136 B1 | 6/2020 | Hecht | G06F 21/6245 |
| 10,865,136 B2 | 6/2020 | Hecht et al. | |
| 11,100,572 B1 | 8/2021 | Hecht et al. | |
| 11,232,449 B1 | 1/2022 | Hecht | G06Q 20/3674 |
| 11,356,430 B1 | 6/2022 | Kapczynski et al. | |
| 2003/0065576 A1 | 4/2003 | Harris et al. | |
| 2007/0124820 A1 | 5/2007 | Burch et al. | |
| 2010/0095372 A1 | 4/2010 | Hodgkinson et al. | |
| 2012/0131057 A1 | 5/2012 | Youn et al. | |
| 2013/0139229 A1 | 5/2013 | Fried et al. | |
| 2014/0147020 A1 | 5/2014 | Baldwin | H04N 21/2541 382/118 |
| 2015/0363786 A1 | 12/2015 | Kolupaev et al. | |
| 2017/0193087 A1 | 7/2017 | Savliwala | H04L 51/18 |
| 2017/0251025 A1 | 8/2017 | Varley et al. | |
| 2018/0060496 A1* | 3/2018 | Bulleit | H04L 7/0643 |
| 2018/0260582 A1 | 9/2018 | Brouwer | |
| 2019/0220898 A1 | 7/2019 | Rhodes et al. | |
| 2019/0312733 A1 | 10/2019 | Engan et al. | |
| 2019/0355065 A1 | 11/2019 | Ramaratnam | G06Q 40/12 |
| 2020/0265046 A1 | 8/2020 | Tang et al. | |
| 2020/0374132 A1* | 11/2020 | Lobban | G06Q 10/00 |
| 2021/0034778 A1* | 2/2021 | Zamir | G06F 16/435 |
| 2021/0057061 A1 | 2/2021 | Bass et al. | |
| 2021/0081396 A1 | 3/2021 | Tian et al. | |
| 2021/0204120 A1 | 7/2021 | Nair | H04W 12/63 |
| 2021/0287770 A1* | 9/2021 | Anderson | G16H 40/20 |
| 2022/0247570 A1 | 8/2022 | Watanabe et al. | |
| 2023/0014970 A1 | 1/2023 | Gujarathi et al. | |

FOREIGN PATENT DOCUMENTS

| | | |
|---|---|---|
| EP | 2993619 A1 | 3/2016 |
| WO | WO2019/179533 | 9/2019 |

OTHER PUBLICATIONS

"xSTR-ekyc e-KYC use cases in digital financial services", ITU-T Draft; Study Period 2021-2024; Study Group 17, International Telecommunication Union, Geneva ; CH ŕ vol. ties/17; Aug. 30, 2021 (Aug. 30, 2021), pp. 1-32, XP044313607, Retrieved from the Internet: URL:https://www-api.itu.int/ifa/t/2017/sgl 7/docs/210824/td/ties/plen/T17-SG17-210824.TD-PLEN-4081 !!ZIP-E.zip TD4081-Att.docx [retrieved on Aug. 30, 2021] section 10.3.1; figure 11.

Marcos Allende Lopez: "Self-Sovereign Identity The Future of Identity: Self-Sovereignity, Digital Wallets, and Blockchain", ŕ Sep. 30, 2020 (Sep. 30, 2020), pp. 1-106, XP055805664, Retrieved from the Internet: URL:https://publications.iadb.org/publicat ions/english/document/Self-Sovereign-Ident ity-The-Future-of-Identity-Self-Sovereigni ty-Digital-Wallets-and-Blockchain.pdf [retrieved on May 19, 2021] p. 16-p. 29; figures 2,9.

U.S. Appl. No. 17/899,488: Office Action dated Aug. 29, 2024. U.S. Appl. No. 17/899,488 has common subject matter as the instant application and the same Applicant, Mastercard International Incorporated.

Buldas, A., Truu, A., Laanoja, R., Gerhards, R. (2014). Efficient Record-Level Keyless Signatures for Audit Logs. In: Bernsmed, K.,Fischer-Hubner, S. (eds) Secure IT Systems. NordSec 2014. Lecture Notes in Computer Science(), vol. 8788. Springer, Cham. https://doi.org/10.1007/978-3-319-11599-3 9; (Year: 2014); 16 pgs.

* cited by examiner

SYSTEMS AND METHODS FOR USE IN IMPLEMENTING SELF-SOVEREIGN CREDENTIALS

CROSS-REFERENCE TO RELATED APPLICATION

This application claims the benefit of, and priority to, U.S. Provisional Application No. 63/238,996, filed Aug. 31, 2021. The entire disclosure of the above application is incorporated herein by reference.

FIELD

The present disclosure is generally directed to systems and methods for use in establishing self-sovereign credentials, and in particular, to systems and methods for use in provisioning self-sovereign credentials to user devices and sharing the self-sovereign credential in one or more computer networks in connection with user authentication.

BACKGROUND

This section provides background information related to the present disclosure which is not necessarily prior art.

In various networks, identity data structures of users are often stored in either centralized or distributed storage (e.g., where the identity data structures include personal identifying information (PII) for the users, etc.), and arranged to be disseminated in response to requests from the users and/or relying parties associated with the users. In connection therewith, one or more entities often control the data structures of the users, whereby access and sharing of information contained in the data structures is defined, and enforced, generally, by the one or more controlling entities.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Users are associated with identities, to which the users may be authenticated in connection with various activities, such as, for example, requesting or directing services (e.g., healthcare services, travel services, telecommunication services, etc.), establishing accounts (e.g., bank accounts, retirement accounts, email accounts, etc.), etc. The identities of the users are often evidenced by physical documents, or digital identities, whereby issuers of the documents or digital identities provide assurances of the users' identities. When data structures indicative of the identities are hosted by central authorities, the central authorities generally impose control on the data structures, and set rules for access, sharing, deletion, etc. (which may be subject to privacy rules, laws or regulations, etc.). In this manner, the control for the instances of the users' identities is passed to the central authorities, and consequently, the users may be limited in the control of the instances of their identities.

Uniquely, the systems and methods herein provide for self-sovereign credentials indicative of identities of users, which are provisioned to the users and controlled by the users. In particular, an identity provider participates (e.g., as an issuer or as service, etc.) for the issuing of the self-sovereign (or verifiable) credentials for users, to mobile devices of the users. The credentials may then be leveraged by relying parties, in interacting with the users, where the credentials are verified by the identity provider, or through service(s) associated with the identity provider, to thereby verify identities of the users. The identity provider, or other issuer of the credentials, therefore, is able to push the credentials into the users' mobile devices, and the relying parties are then able to rely on the credential as proof or evidence of the identities of the users.

In this manner, the advent of the self-sovereign credentials in the users' mobile devices provides for open and scalable proliferation of corresponding identity credentials (subject to, potentially, governance), whereby the users own their identity and associated data without a requirement for a central authority to manage the same. As such, the self-sovereign credentials inhibit control by any authority on the corresponding identity credentials retained in the mobile devices. What's more, the self-sovereign credentials provide a technological solution, whereby trust of participants may be enhanced based on legal frameworks and contracts, while still potentially providing options for the users to interact with closed loop identity models (e.g., by supporting authentication requests in a form consistent with such models, etc.).

Figure 1:
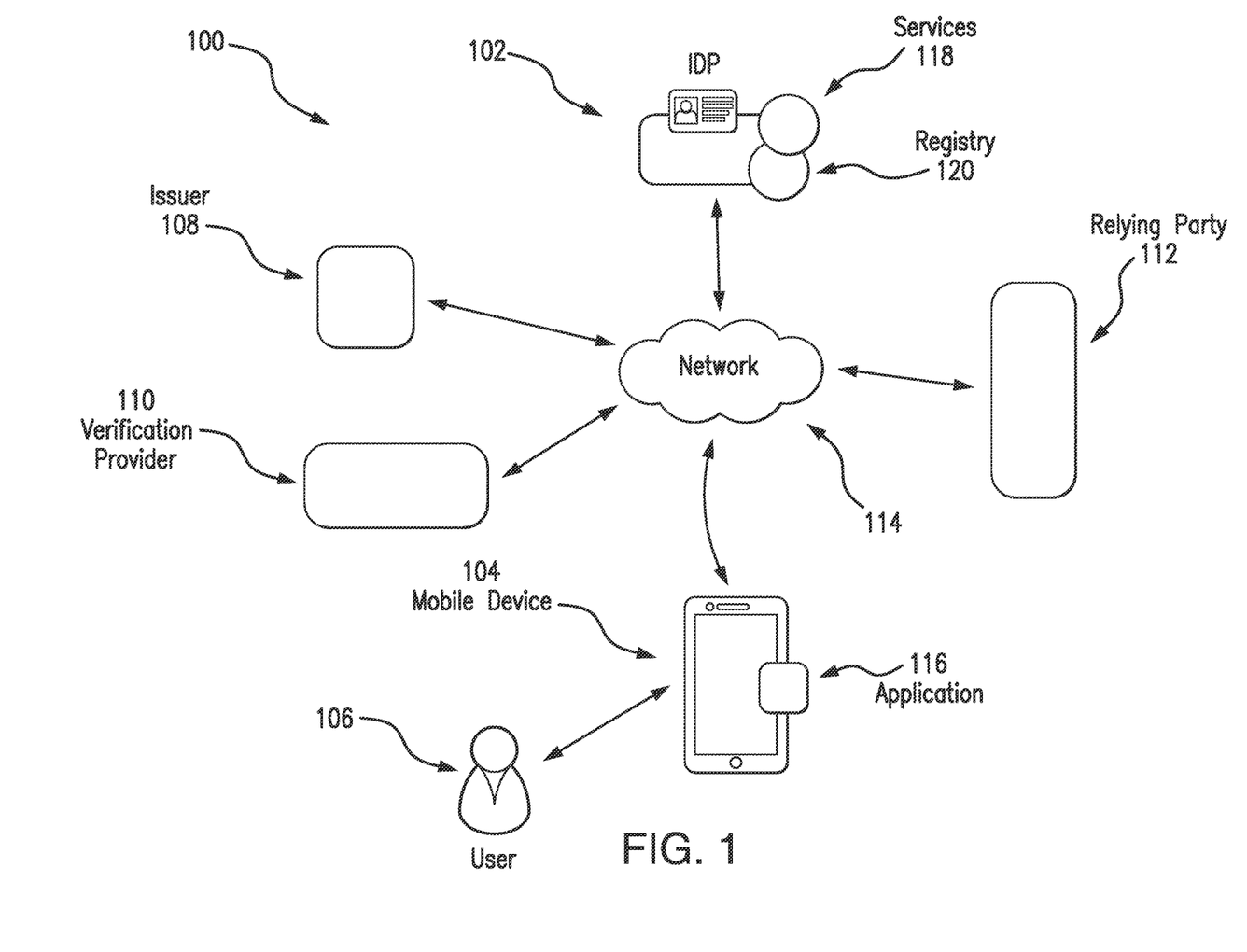
FIG. 1 illustrates an example system of the present disclosure suitable for use in implementing operations related to self-sovereign (or verifiable) credentials.

FIG. 1 illustrates an example system 100 in which one or more aspects of the present disclosure may be implemented. Although the system 100 is presented in one arrangement, other embodiments may include the parts of the system 100 (or other parts) arranged otherwise depending on, for example, relationships between users, interactions between users and relying parties, platforms for identity services and third party databases, privacy concerns and/or requirements, etc.

The illustrated system 100 generally includes an identity provider (IDP) 102, a mobile device 104 associated with a user 106, an issuer 108 of credential(s) for users (including the user 106), a verification provider 110, and a relying party 112, each of which is coupled to network 114. The network 114 may include, without limitation, one or more of a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. Further, in various implementations, the network 114 may include multiple different networks, where one or more of the multiple different networks are then accessible to particular ones of the IDP 102, the mobile device 104, the issuer 108, the verification provider 110 and the relying party 112.

In this example embodiment, the IDP 102 generally is associated with provisioning verifiable (or self-sovereign) credentials associated with users (e.g., the user 106, etc.), where, in the illustrated embodiment, the verifiable credentials are self-sovereign to the user 106 and/or the mobile device 104. In addition, the IDP 102 is configured to coordinate among the user 106, the issuer 108, the verification provider 110 and the relying party 112, etc., to provide for the self-sovereign credentials, whereby the IDP 102 may be configured to perform one or more services 118, as described in more detail below. The services 118 may include, without limitation, verification services, policy and assurance services, audit services, billing services, etc.

In addition, as shown in FIG. 1, the IDP 102 includes a registry 120, which is a data structure configured to store certain information as described herein. For example, the registry 120 may include an audit log data structure, where identity interactions are logged (e.g., pursuant to the audit service, etc.), as evidence of the interactions, and a public key data structure were keys associated with issuers, for example, are stored and retrievable. The registry 120 may further include rules, assurances, etc., usable with the services 118 of the IDP 102, as described in more detail below. It should be appreciated that while the registry 120 is included in the IDP 102 in the illustrated system 100, it may be included elsewhere, or as a standalone computing device, in other embodiments, or also partially included in the IDP 102 and partially included elsewhere or partially as a standalone computing device, etc. What's more, in some example embodiments, the registry 120 may include (or may be implemented in) block chain other distributed ledger technology or cloud-based services.

The mobile device 104 in the illustrated system 100 includes a portable mobile device such as, for example, a tablet, a smartphone, a personal computer, etc. What's more, the mobile device 104 also includes a network-based application 116, which configures the mobile device 104 as described herein. In the illustrated embodiment, the application 116 is provided by and/or associated with the IDP 102, as a standalone application (e.g., dedicated to identity capabilities or associated with one or more other capabilities, etc.). Alternatively, the application 116 may be provided as another application with one or more different purposes (e.g., as part of a financial application (e.g., a digital or virtual wallet application, a banking application, etc.), an email application, a social-network application, a telecommunication application, a health application, etc.), with a software development kit (SDK) integrated therein whereby the SDK is provided by and/or associated with the IDP 102 and configures the mobile device 104 (as part of the other application) to interact with the IDP 102. In the particular embodiment of FIG. 1, the application 116 includes a wallet application with an SDK integrated therein, where the SDK is provided by and/or associated with the IDP 102 to enable the mobile device 104 to interact with the IDP 102 as described herein. That said, it should be appreciated that the mobile device 104 may include other devices under control of the user 106 in other embodiments, including, for example, smart devices (e.g., smart watches, smart rings, etc.), personal data stores, etc.

As shown in FIG. 1, the system 100 includes the issuer 108, which, generally, issues credentials to users, for example, to the user 106. Example issuers include, for example, and without limitation, government agencies (e.g., for passports, driver licenses, etc.), financial institutions (e.g., for bank accounts, for credit accounts, etc.), employers, education institutions (e.g., for degrees, etc.), insurance institutions (e.g., for insurance policies/coverage, etc.), etc. The credentials may include different aspects of the identity of the user 106, for example, as indicated by personal identifying information (PII). Example credentials may include, without limitation, a name, a mailing address, a phone number, government ID numbers, account numbers, group numbers, employee ID numbers, biometrics, etc., which may be separate from or integrated in physical documents, digital documents, etc., issued by the issuer 108.

In this example embodiment, the issuer 108 is enrolled with the IDP 102, whereby the registry 120 includes (e.g., in the public key data structure, etc.) a public key associated with the issuer 108, and corresponding with a private key of the issuer 108.

The verification provider 110 in the illustrated embodiment is configured to generally verify or validate an authenticity of credentials associated with various users, including, for example, the user 106. In this manner, the verification provider 110 is a verification service, which may be called by the other entities in the system 100. As such, the verification provider 110 may be configured to, for example, rely on data structures included therein, or interact with third parties (not shown), or interact with the issuer 108 (or other issuers), etc. to verify that a credential is a valid or authentic credential, is properly signed, is of a correct form or format, etc. That said, in some example embodiments, the verification provider 110 and the issuer 108 may include the same entity, whereby the issuer 108 of a given credential may also be the verification provider 110 for the credential such as, for example, a government entity configured to issue credentials and also to verify the credentials issued thereby (e.g., a department of motor vehicles configured issue driver's licenses and verify a data scheme for the issued driver's licenses, etc.). What's more, the verification provider 110 may be included, in whole or in part, in other entities in the system 100 (e.g., IDP 102, etc.), as appropriate and/or as desired in a particular embodiment.

The relying party 112 in the system 100 may include any entity and/or person, which receives identifying information (e.g., PII, etc.) for the user 106 (or other users) and expects and/or intends to rely on the identifying information for one or more purposes. In connection therewith, the relying party 112 is also a verifier of the credentials herein, and may be configured, for example, to rely on data structures included therein, or interact with third parties (not shown), etc. to verify that a credential is specific to the user 106. For example, the relying party 112 may include a financial institution (e.g., a bank, an investment broker, etc.), a utility provider, a telecommunication provider, a medical service provider, a potential employer, etc., with which the user 106 may interact for the desired products, services or interactions (and to which the user 106 may be required to verity his/her identity in order to receive the desired product, service or interaction). As another example, the relying party 112 may include a financial institution (e.g., a bank, etc.) relying on identity and proof of income credentials for the user 106 in order to open a bank account for the user 106. As a further example, the relying party 112 may include an employer relying on identity, qualifications and proof of work history for an the user 106 (e.g., as an employee, etc.) in connection with onboarding the user 106.

While only one IDP 102, one mobile device 104, one user 106, one issuer 108, one verification provider 110, and one relying party 112 are illustrated in the system 100, it should be appreciated that additional ones of these parts/parties may be included in other system embodiments. Specifically, for example, it should be appreciated that other system embodiments will generally include multiple other users and multiple other relying parties, etc.

Figure 2:
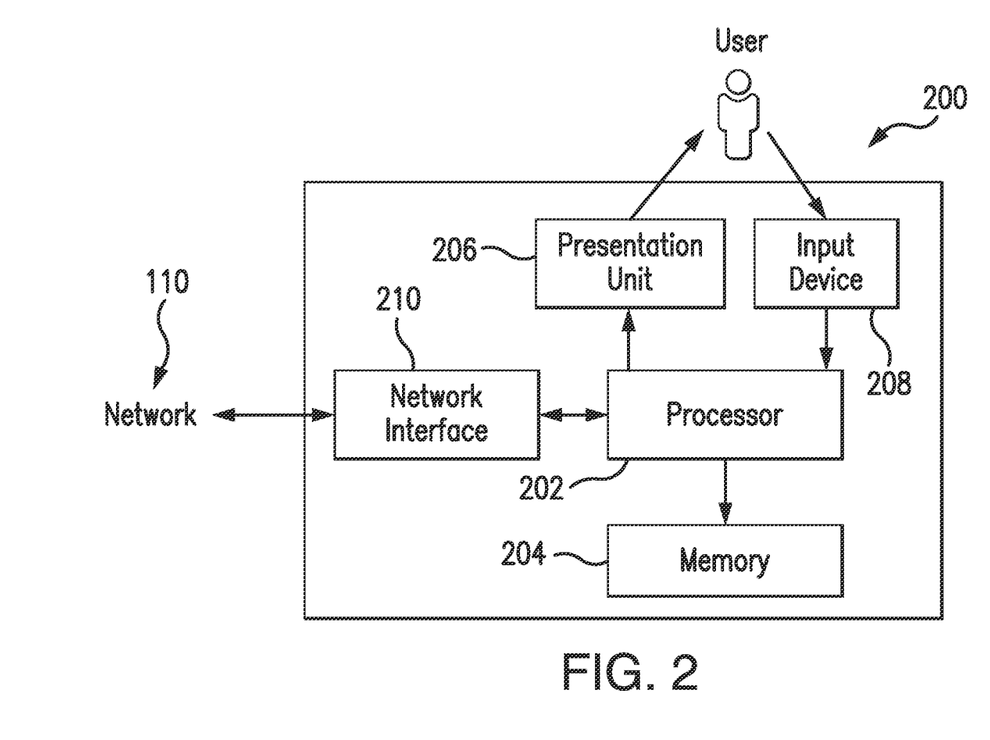
FIG. 2 is a block diagram of a computing device that may be used in the example system of FIG. 1.

FIG. 2 illustrates an example computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the example embodiment of FIG. 1, each of the IDP 102, the mobile device 104, the issuer 108, the verification provider 110, and the relying party 112 may be considered, may include, and/or may be implemented in a computing device consistent with the computing device 200, coupled to (and in communication with) the one or more networks of the system 100. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, identifying information (e.g., PII, etc.), verifiable credentials, keys, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein (e.g., one or more of the operations of method 300, etc.), whereby upon (or in connection with) performing such operation(s) the computing device 200 may be transformed into a special purpose computing device. It should be appreciated that the memory 204 may include a variety of different memories, each implemented in one or more of the functions or processes described herein.

In the example embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information, visually or audibly, for example, to a user of the computing device 200 (e.g., identifying information, requests to accept/confirm, etc.), etc. And, various interfaces (e.g., as defined by the application 116, etc.) may be displayed at computing device 200, and in particular at presentation unit 206, to display certain information in connection therewith. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user 106 (i.e., user inputs) of the computing device 200 such as, for example, user inputs to select an option/offer or request information, etc., as further described below. The input device 208 may include a single input device or multiple input devices. The input device 208 is coupled to (and is in communication with) the processor 202 and may include, for example, one or more of a keyboard, a pointing device, a mouse, a camera, a touch sensitive panel (e.g., a touch pad or a touch screen, etc.), another computing device, and/or an audio input device. In various example embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., an NFC adapter, a Bluetooth™ adapter, etc.), a mobile network adapter, or other device capable of communicating to one or more different networks herein (e.g., network 114, etc.) and/or with other devices described herein. In some example embodiments, the computing device 200 may include the processor 202 and one or more network interfaces incorporated into or with the processor 202.

Referring again to FIG. 1, in this example embodiment, the IDP 102 is configured to participate in issuing verifiable (or self-sovereign) credentials to the user 106, and specifically, the application 116 of the mobile device 104. In particular, in one example implementation, the IDP 102 is configured to receive a credential to be add to the application 116, from the user 106, via the mobile device 104 and to verify/validate an authenticity of the credential with the verification provider 110 (as associated with the credential, as the issuer 108 of the credential, etc.). The IDP 102 may then be configured to create a verifiable credential, and issue the verifiable credential to the application 116 of the mobile device 104, for later use. In this implementation, for example, the IDP 102 becomes the issuer of the verifiable credential.

In another example implementation, the IDP 102 is configured to support the issuer 108 in issuing the verifiable (or self-sovereign) credential. In particular, the issuer 108 is configured, in response to a request from the user 106 to issue the credential, to call services 118 of the IDP 102. For example, the issuer 108 is configured to call a verification service of the IDP 102 to verify the user 106 is the subject of the credential, whereby the IDP 102 is configured to verify, either directly or through other services (e.g., the verification provider 110, etc.), whether the credential is authentic and whether the user 106 is the subject of the credential (e.g., validate a format of a passport, verify the user 106 is the user reflected in the passport, etc.). Further, the issuer 108 may be configured to call a policy and assurance service of the IDP 102, in order to assign a level of assurance (or level of confidence) to the credential. The level of assurance may include, for example, a trust level or value in a specific credential, or it may include a weight associated with a given credential type. Additionally, or alternatively, the level of assurance may include a trust level or value in the user's overall identity. For instance, a credential such as a mobile driver's license (mDL) may itself be given a relatively high strength or level of assurance (e.g., a level of assurance of "strong", etc.) based on the type of the credential (i.e., as the mDL). The credential may then be combined with other credentials associated with the user to give a level of assurance in the user's claimed identity (e.g., an identity assurance level of 2 (IAL2) under the Enrollment and Identity Proofing section of the National Institute of Standards and Technology (NIST) special publication (SP) 800-63 (which is incorporated herein by reference), etc.). And, also, the issuer 108 may be configured to call an audit service of the IDP 102, to record transactions associated with the issuance of the verifiable credential to the mobile device 104, in the registry 120, for example. In addition, in this implementation, the issuer 108 is configured, based on the services 118 of the IDP 102, to offer the verifiable credential to the user 106 and/or to issue the verifiable credential to the user 106, at the application 116 of the mobile device, etc.

Apart from the issuance of the verifiable credential, the IDP 102 is configured to participate in use of verifiable credentials for the user 106 from the application 116 of the mobile device 104.

In particular, in one implementation, the relying party 112 is configured to connect to a mobile device 104, to request a verifiable (or self-sovereign) credential in response to a request by the user 106 to interact with the relying party 112. The mobile device 104 is configured, by the application 116, to respond to the request by calling services 118 of the IDP 102 to confirm the user 106 is supposed to share the credential with the relying party 112 and to confirm the credential is sufficient in view of the relying party's request. Thereafter, the mobile device 104 is configured, by the application 116, to share the credential with the relying party 112. In addition, the mobile device 104 is configured, by the application 116, to call an audit service of the IDP 102, to create an audit log entry in the registry 120 to log the interactions with the services 118 and/or the relying party 112.

In turn, the relying party 112 is configured to retrieve the public key for an issuer of the credential from the IDP 102 (and in particular, from the registry 120) and to verify the credential with the public key. And, then, the relying party 112 is configured to continue in interacting with the user 106, in response to the credential being verified, which may include, for example, delivering requested services to the user 106, etc.

With continued reference to FIG. 1, in another implementation, the relying party 112 is configured to request the credential from the IDP 102, based on a access request from the user 106 to the relying party 112. In response, the IDP 102 is configured to interact with the user 106, at the mobile device 104, whereupon the mobile device 104 is configured, by the application 116, to authenticate the user 106 and to confirm consent of the user 106 to share the credential. The mobile device 104 is configured, by the application 116, in response to authentication and/or consent, in this example, to share the verifiable credential with the IDP 102. The IDP 102 is configured, then, to verify the verifiable credential, based on a public key retrieved from the registry 120 for the issuer of the credential, and then to provide an authorization of the credential to the relying party 112 (in response to the request for the credential) (e.g., with a link, etc.). Here, for example, the authorization of the credential may include an OpenID Connect (OIDC) authorization of the credential.

The relying party 112 is configured to then request the credential, or identifying data therein, from the IDP 102, and includes with the request the authorization of the credential received from the IDP 102. In response, the IDP 102 is configured to verify the authorization and to, when verified, return the requested identifying data to the relying party 112. The relying party 112 is then permitted to proceed with the user 106, based on the identifying information from the IDP 102.

Figure 3:
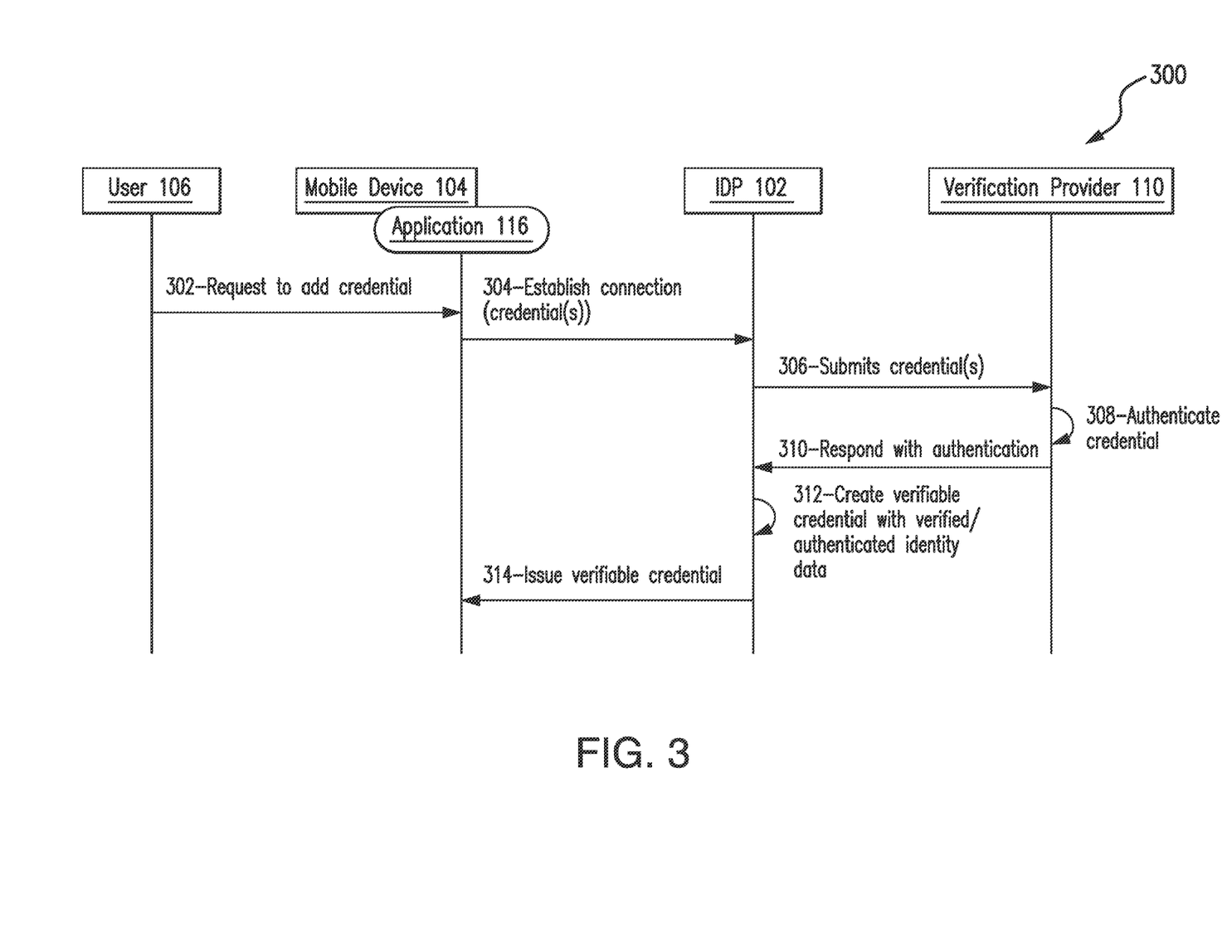
FIG. 3 illustrates an example method, which may be implemented in connection with the system of FIG. 1, for use in issuing a verifiable (or self-sovereign) credential to a mobile device.
Figure 4:
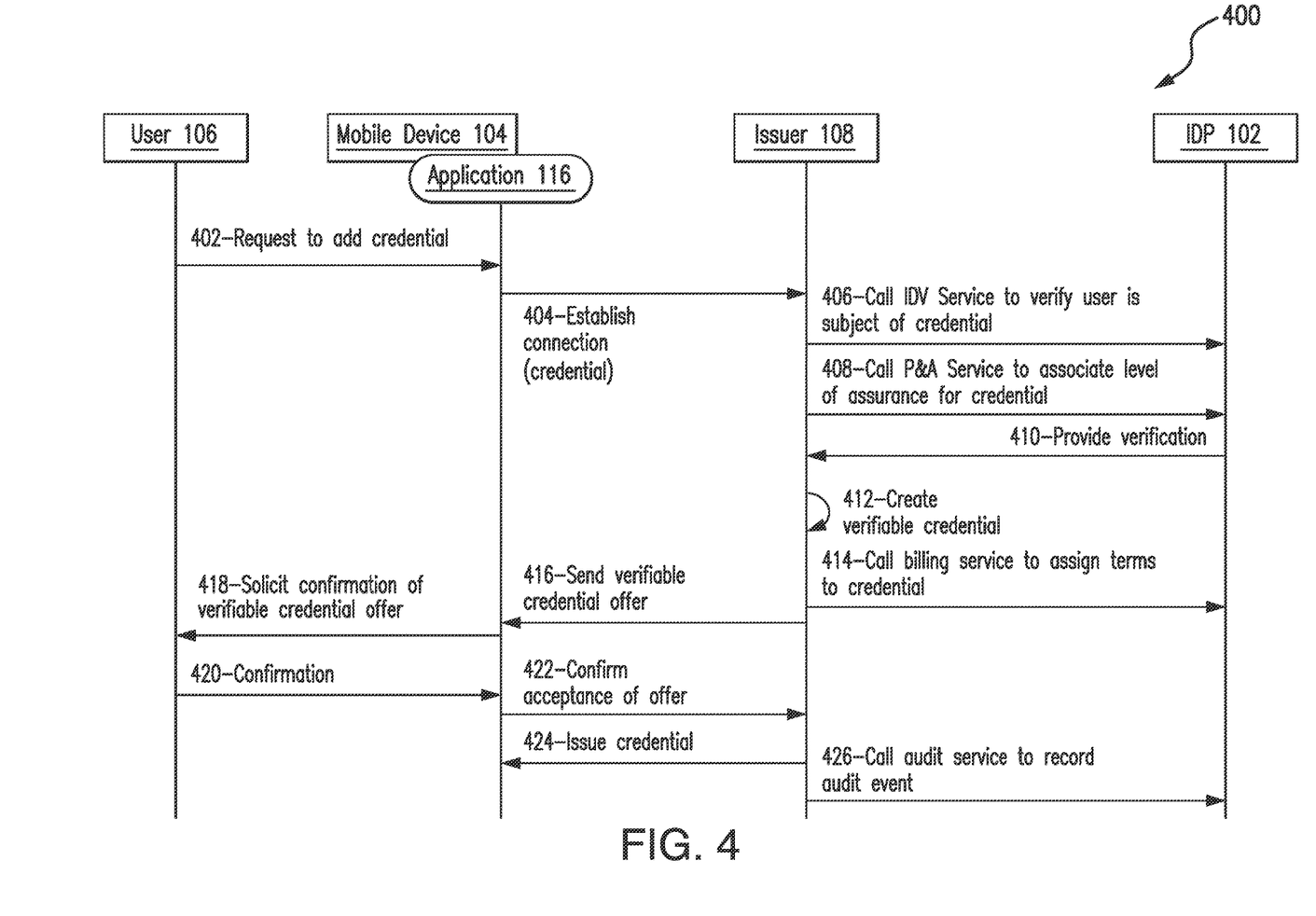
FIG. 4 illustrates an example method, which may be implemented in connection with the system of FIG. 1, for using a verifiable (or self-sovereign) credential issued to a mobile device based on services associated with an identity provider.

In the various embodiments herein, a verifiable credential may be issued and/or provisioned to the mobile device 104. In connection therewith, certain steps may be taken to, for example, verify the credential to be added by the user 106, and to log the creation of the verifiable credentials, along with other relevant steps. It should be appreciated that the steps may be performed by an issuer of the verifiable credential, for example, or by another party. FIGS. 3 and 4 illustrate two example methods through which a verifiable credential is issued to the mobile device 104, and in particular, the application 116 included therein. In FIG. 3, the verifiable credential is issued by the IDP 102, while in FIG. 4 the verifiable credential is issued by the issuer 108, as described in more detail below.

That said, FIG. 3 illustrates an example method 300 for use in adding a verifiable (or self-sovereign) credential to the user's mobile device 104, based on a credential provided by the user 106, where the IDP 102 then issues the verifiable credential to the user 106 based on the credential provided by the user 106. The example method 300 is described as implemented in system 100, with reference to the IDP 102, the mobile device 104 and the verification provider 110, and with additional reference to the computing device 200. That said, however, the methods herein should not be understood to be limited to the system 100 or the computing device 200, as the methods may be implemented in other systems and/or computing devices. Likewise, the systems and the computing devices herein should not be understood to be limited to the example method 300.

At the outset in the method 300, the user 106 accesses the application 116 at the mobile device 104, and requests, at 302, to add a credential to the application 116, for presentation to one or more parties as desired (e.g., the relying party 112, etc.).

In response, the mobile device 104 (as configured by the application 116) establishes, at 304, a connection between the user 106 and the IDP 102. In connection therewith, the mobile device 104 provides the credential to the IDP 102 (e.g., a passport, a driver's license, an insurance card, etc.). The credential may include, for example, an image of a document associated with the user 106, which includes one or more identity attributes of the user 106. For instance, the document may include a passport of the user 106 (e.g., with a level of assurance of 2 on a scale of 1-3 (e.g., in accordance with NIS TSP 800-63, etc.), etc.), and the identity attributes may include a name of the user 106, a date of birth of the user 106, a passport number of the passport, etc. Or, the document may include a social security card (e.g., with a level of assurance of 2 on a scale of 1-3, etc.) of the user 106, and the identity attributes may include the name of the user 106 and a social security number of the user 106. That said, identity attributes may include, without limitation, a name, a mailing address, a government ID number, an account number (e.g., an insurance policy number, a bank account number, a credit card number, etc.), one or more biometrics, etc. In one example, the mobile device 104 establishes a wireless connection (e.g., via a network session, via an application programming interface (API), etc.) to the IDP 102, whereupon the IDP 102 queries the user 106, via the mobile device 104, to provide the credential, through one or more interfaces displayed at the mobile device 104. The mobile device 104 then captures the credential from the user 106 (e.g., via a camera input device 208, etc.) and transmits the credential to the IDP 102, upon entry of the credential to the mobile device 104. It should be appreciated that various different sequences, or different interfaces, may be employed by the IDP 102 to solicit and/or receive the credential from the user 106, via the mobile device 104.

The IDP 102 then verifies the credential received from the user 106, in preparation to create a verifiable credential based thereon. For instance, in this example, as part of verifying the credential, the IDP 102 actually submits, at 306, the credential to the verification provider 110 for authentication of the credential itself (e.g., to a department of motor vehicles to authenticate a driver's license credential, etc.). In response, the verification provider 110, at 308, authenticates the credential received from the IDP 102. In particular, for example, the verification provider 110 may authenticate a form (or format) of the credential, a signature of the credential, other attributes of the credential, etc. And, once verified, the verification provider 110 responds, at 310, to the IDP 102, with an authentication of the credential which is representative of and/or includes the verified identity data for the user 106. The verified identity data may include one or more attributes of the user's identity, for example, from the credential submitted to the verification provider 110.

Alternatively, in verifying the credential (and in lieu of submitting the credential to the verification provider 110), the IDP 102 may retrieve the public key of the issuer 108 associated with the credential, from the registry 120, and then confirm, via the public key, that the credential was issued by the claimed issuer 108. In addition, the IDP 102 may check a signature associated with the credential to confirm that a content of the credential has not been altered. Additionally, or alternatively, the IDP 102 may verify a format of the credential by obtaining a definition of the credential. For example, where the credential is a state driver's license, the IDP 102 may obtain a credential definition (e.g., a data schema for the driver's license, including attribute names, whether mandatory or optional, field formats, etc.) from the issuer of the driver's license (e.g., directly for each credential, or from the repository 120 based on previously obtaining the credential definition from the issuer, etc.) and compare the credential to the associated credential definition. That said, in some embodiments, such verification may be controlled or directed by one or more terms of use associated with the credential, and issued by the issuer of the credential, indicating with whom the credential may be shared, etc.

The IDP 102 then creates, at 312, a verifiable credential for the user 106 based on the credential received from the user 106 (and based on the authentication thereof), and which includes identity data from the credential received form the user 106, in whole or in part. The identity data may include one or more attributes of the user's identity, for example, gleaned from the credential.

In one example embodiment, the verifiable credential created by the IDP 102 may include a W3C Verifiable Credential (W3C VC) (see, for example, https://www.w3.org/TR/vc-data-model/, etc.), which allows interactions with conventional services such as, for example, OIDC (e.g., authorization of credentials, etc.), RESTful application programming interfaces (APIs), Security Assertion Markup Language (SAML), etc. and translations, as needed, into other architectures (e.g., the self-sovereign identity (SSI) architecture, etc.). In connection therewith, the verifiable credential (e.g., the W3C VC, etc.) may be signed using a private key of (or associated with) the IDP 102 (e.g., a private key specific to the IDP, a private key specific to an identity verification provider (IVP) and managed by the IDP 102 on behalf of the IVP, etc.). Then, as described in more detail hereinafter (e.g., in FIGS. 5 and 6, etc.), the relying party 112, when interacting with the user 106 and needing to verify the verifiable credential shared by the user 106 with the relying party 112, may retrieve the public key of the issuer of the verifiable credential (e.g., the IDP 102, etc.) and check the integrity of the verifiable credential. What's more herein, in some implementations the relying party 112 may perform a periodic (e.g., at a start of a day, etc.) pull of all public keys that may be required to perform such checks and store them locally, whereby the required key for a given issuer will be readily available upon receipt of a verifiable credential from a user. As can be appreciated, this may provide performance benefits to the relying party 112, as they may not be required to repeatedly obtain keys for each transaction, and may also provide offline capabilities to the relying party 112.

And, at 314, the IDP 102 issues the verifiable credential to the mobile device 104, and in particular, the application 116. The mobile device 104 then stores the verifiable credential as appropriate, for example, in a memory (e.g., memory 204, etc.) of the mobile device 104 such as for example, a trusted execution environment (TEE) or secure element (SE), otherwise on the mobile device, in a user cloud, in a personal data store, etc. for later use by the user 106 in proving the user's identity.

FIG. 4 illustrates another example method 400 for use in adding a verifiable (or self-sovereign) credential to the user's mobile device 104, based on a credential provided by the user 106, where the issuer 108 then issues the verifiable credential to the user 106. The example method 400 is described as implemented in system 100, with reference to the IDP 102, the mobile device 104, and the issuer 108, and with additional reference to the computing device 200. That said, however, the methods herein should not be understood to be limited to the system 100 or the computing device 200, as the methods may be implemented in other systems and/or computing devices. Likewise, the systems and the computing devices herein should not be understood to be limited to the example method 400.

Like above, the user 106 accesses the application 116 at the mobile device 104, and requests, at 402, to add a credential to the application 116, for presentation to one or more parties (e.g., the relying party 112, etc.) for use in verifying an identity of the user 106.

In response, the mobile device 104 (as defined by the application 116) establishes, at 404, a connection between the user 106 and the issuer 108. In connection therewith, the mobile device 104 provides the credential to the issuer 108, as captured from the user 106 (e.g., via a camera input device 208 of the mobile device 104, etc.). The credential may include, for example, as above, an image of a document associated with the user 106, which may include identity attributes of the user 106.

The issuer 108 then calls, at 406, an identity and verify (IDV) service associated with the IDP 102, in order to verify the user 106 is the subject of the credential provided by the user 106. The IDP 102, based on the credential, and other identity data for the user 106 and/or the issuer 108, verifies the user 106 is the subject of the credential. As an example, in order to verify the user 106 is the subject of the credential provided by the user 106, the IDP 102 may retrieve the public key of the issuer 108 associated with the credential, from the registry 120, and then confirm, via the public key, that the credential was issued by the claimed issuer 108. In addition, the IDP 102 may check a signature associated with the credential to confirm that a content of the credential has not been altered. As another example, the IDP 102 may verify a format of the credential by obtaining a definition of the credential. For instance, where the credential is a state driver's license, the IDP 102 may obtain a credential definition (e.g., a data schema for the driver's license, including attribute names, whether mandatory or optional, field formats, etc.) from the issuer of the driver's license and compare the credential to the associated credential definition. As a further example, where the credential is an education certificate, in verifying the education certificate, the IDP 102 may require that the credential and/or the user's digital identify have at least a minimum assurance level (e.g., an Identity Assurance Level (IAL) 2 under the Enrollment and Identity Proofing section of the NIST SP 800-63, an Authentication Assurance Level (AAL) 3 under the Authentication and Lifecycle Management section of the NIST SP 800-63, etc.) and that the verified name in the user's digital identity match the name on the education certificate. What's more, in some examples this may also include verifying that the user 106 and/or the application 116 to which the verifiable credential is to be added is accredited or certified (e.g., by the IDP 102, the relying party 112, the issuer 108, etc., whereby certain review of the wallet has established a degree of trust and/or confidence in the data and/or data controls associated with the wallet; etc.).

Additionally, the issuer 108 also calls, at 408, the policy and assurance (P&A) service of the IDP 102, in order to associate a level of assurance to the credential. In response, the IDP 102 determines, based on the credential and associated information about the request (e.g., the user 106, type of verification, etc.), a level of assurance to associate with the credential. The level of assurance generally provides a confidence (or confidence amount) in how the credential was issued to the user 106. A generally higher level of assurance may provide greater confidence that the credential was issued to the subject of the credential (i.e., the user 106) and not to a third party. It should be noted that some credentials may not need higher levels of assurance (e.g., a discount coupon, etc.) whereas others may (e.g., a vaccination certificate, etc.). That said, the level of assurance may include, for example, a trust level or value in a specific credential, or it may include a weight associated with a given credential type. Additionally, or alternatively, the level of assurance may include a trust level or value in the user's overall identity. For instance, a credential such as a mobile driver's license (mDL) may itself be given a relatively high strength or level of assurance (e.g., a level of assurance of "strong", etc.) based on the type of the credential (i.e., as the mDL). The credential may then be combined with other credentials associated with the user to give a level of assurance in the user's claimed identity (e.g., an IAL2 under the NIST SP 800-63, etc.).

Once the IDP 102 performs the requested services (e.g., the identity and verify service, the policy and assurance service, etc.), the IDP 102 provides, at 410, a verification of the credential, consistent with the requested level of assurance, to the issuer 108. In doing so, the IDP 102 may also provide verified identity data from or for the credential.

In response, the issuer 108 creates, at 412, a verifiable credential for the user 106, which includes the verified identity data from the credential, in whole or in part. As above, the verifiable credential created by the IDP 102 may include a W3C Verifiable Credential (W3C VC) (see, for example, https://www.w3.org/TR/vc-data-model/, etc.). In connection therewith, the verifiable credential (e.g., the W3C VC, etc.) may be signed using a private key of (or associated with) the issuer of the credential (e.g., the issuer 108 in this example, etc.). Then, as described in more detail hereinafter (e.g., with reference to FIGS. 5 and 6, etc.), the relying party 112, when interacting with the user 106 and needing to verify the verifiable credential shared by the user 106 with the relying party 112, may retrieve the public key of the issuer of the verifiable credential (e.g., the issuer 108, etc.) and check the integrity of the verifiable credential.

In addition in this embodiment, the issuer 108 calls, at 414, a billing service of the IDP 102, whereby the terms and conditions of use of the specific verifiable credential are assigned. In particular, terms and conditions assign a specific cost associated with the credential, which may include, for example, the cost of services to create the verifiable credential and/or the cost associated with redemption of the verifiable credential (e.g., by the relying party 112, etc.). In this example, the terms and conditions define a payment from the issuer 108 to the IDP 102 for use of the services associated with verification and assignment of the assurance level, etc.

Thereafter, in this embodiment, the issuer 108 sends, at 416, an offer to provide the verifiable credential, to the user 106, at the mobile device 104. In turn, the mobile device 104 solicits, at 418, a confirmation or acceptable of the offer to provide the verifiable credential. The solicitation, generally, may include a description of the credential, along with the terms and conditions assigned to the credential, which would be imposed when presented to a third party (e.g., the relying party 112, etc.). When the user 106 accepts, the user 106 provides a confirmation, at 420, to the mobile device 104, and then, the mobile device 104 confirms, at 422, the user's acceptance of the offer.

The issuer 108 then issues, at 424, the verifiable credential to the mobile device 104. And, as noted above, the mobile device 104 may store the verifiable credential in a memory (e.g., memory 204, etc.) of the mobile device 104 such as, for example, a trusted execution environment (TEE) or secure element (SE). Additionally, or alternatively, the mobile device 104 may store the verifiable credential at the mobile device 104 in other suitable memory or storage, or away from the mobile device 104 (e.g., in cloud storage in general or specific to the mobile device 104, in a personal data store etc.), etc. for later use by the user 106 in proving the user's identity.

In addition, in the method 400, the issuer 108 calls, at 426, an audit service of the IDP 102 to record the audit event. In particular, the issuer 108 provides the relevant data (e.g., verifiable credential, application ID associated with the application 116, ESN or MAC associated with the mobile device 104, confirmation of the user 106, etc.) to the IDP 102, whereupon the IDP 102 stores the relevant data, or a part thereof, in an audit log data structure. In this manner, the issuance of the verifiable credential to the mobile device 104, and specifically, the user 106, is logged and available for later review and/or confirmation, as needed.

Figure 5:
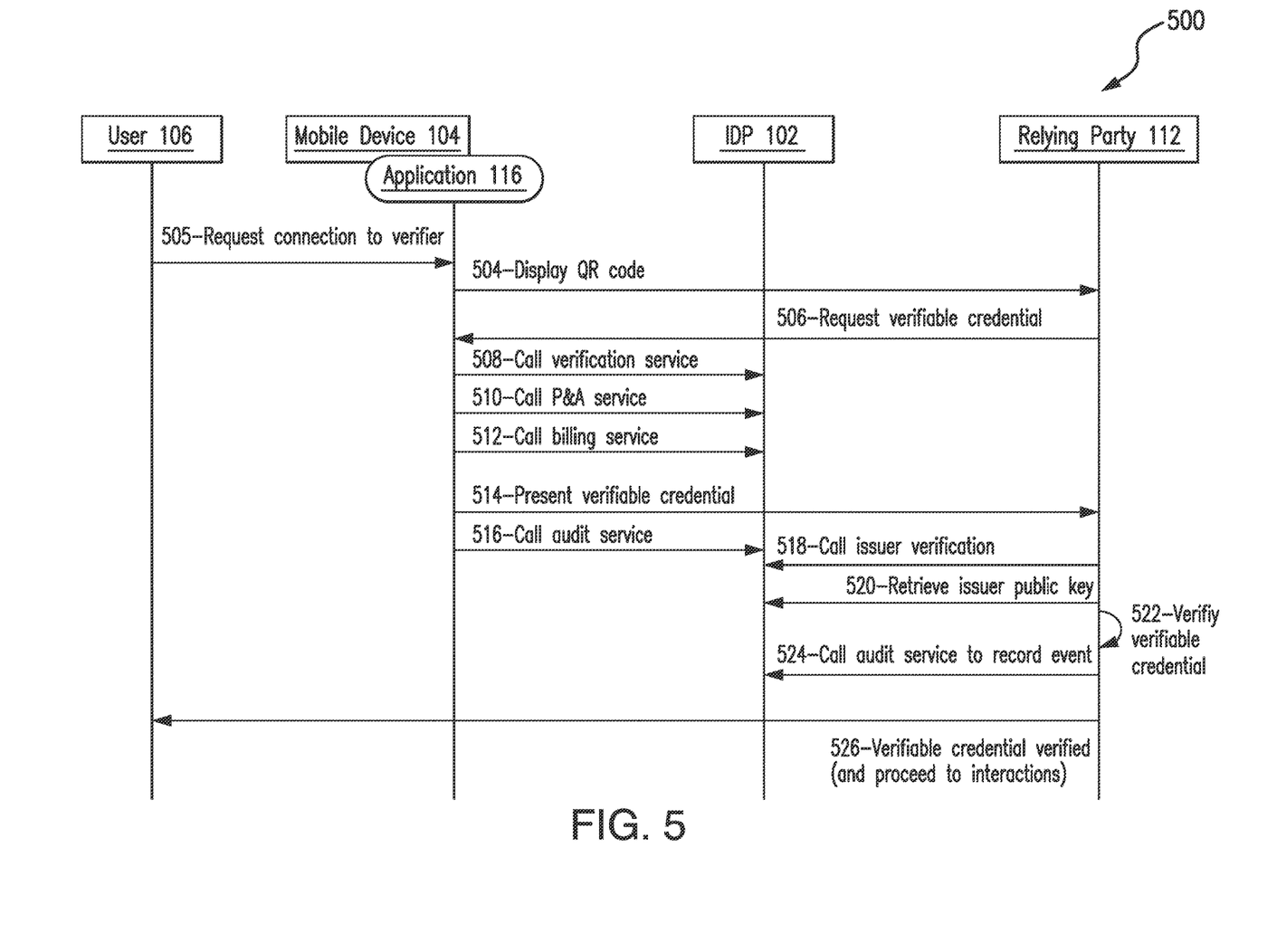
FIG. 5 illustrates an example method, which may be implemented in connection with the system of FIG. 1, for use in providing a credential to a relying party from a mobile device based on services associated with an identity provider.
Figure 6:
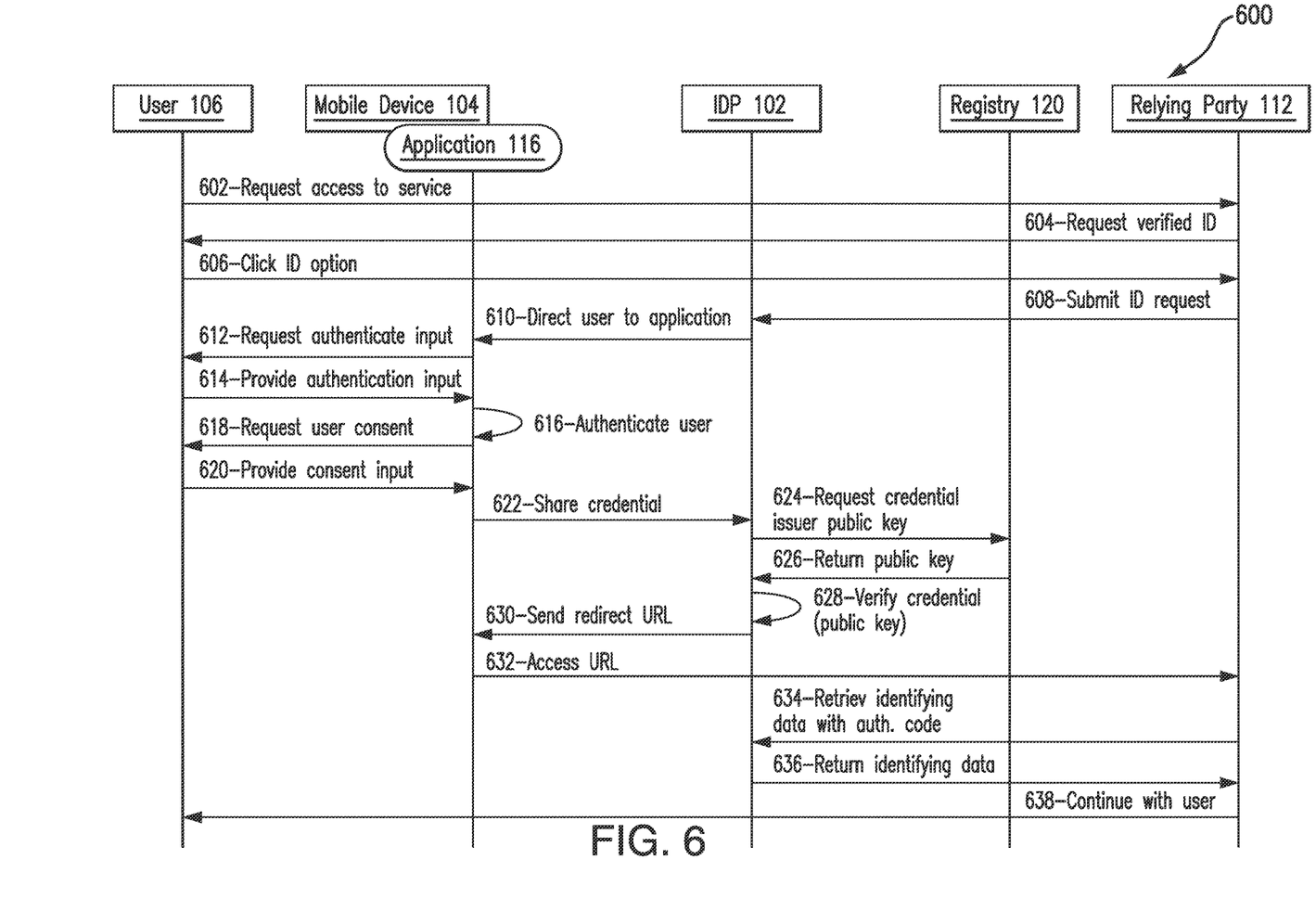
FIG. 6 illustrates an example method, which may be implemented in connection with the system of FIG. 1, for use in providing a credential to a relying party, through an identity provider.

Thereafter, the verifiable credential may be used in connection with one or more different interactions by the user 106, as illustrated in FIGS. 5 and 6, below.

FIG. 5 illustrates an example method 500 for use in providing a verifiable (or self-sovereign) credential by the user 106 to the relying party 112. The example method 500 is described as implemented in system 100, with reference to the IDP 102, and with additional reference to the computing device 200. However, the methods herein should not be understood to be limited to the system 100 or the computing device 200, as the methods may be implemented in other systems and/or computing devices. Likewise, the systems and the computing devices herein should not be understood to be limited to the example method 500.

In connection with method 500, the user 106 desires to interact with the relying party 112, whereby the relying party 112 requests a verifiable credential. In connection therewith, the user 106 requests, at 502, a connection with the relying party 112, to thereby provide the verifiable credential, from the mobile device 104. In response, the mobile device 104 (and specifically, the application 116) displays, at 504, a QR code at the presentation unit 206 of the mobile device 104. The QR code is indicative of the mobile device 104 and/or the application 116, and is specific to the user 106 and/or is specific to the verifiable credential included in the mobile device 104, etc. It should be appreciated that another symbol, character, etc., other than a QR code, may be displayed or otherwise presented in other embodiments.

The relying party 112 then captures the QR code from the mobile device 104, and requests, at 506, a verifiable credential from the mobile device 104, based on data encoded in the QR code (e.g., wireless connection data, identification data, etc.). The request may include, for example, a specific credential as required by the relying party 112, a specific credential associated with the data encoded in the QR code (where the QR code may vary for different credentials, etc.), identifier data associated with the relying party 112, etc. In response, the mobile device 104 calls, at 508, a verification service of the IDP 102 and specifies the particular credential(s) to share, whereupon the IDP 102 verifies that the user 106 should share the credential(s) with the relying party 112. In doing so, the IDP 102 essentially verifies the relying party 112 (e.g., that the relying party 112 has agreed to follow certain data protection requirements, that the relying party 112 is actually able/allowed to ask for the particular credential, etc.).

Next, the mobile device 104 calls the policy and assurance (P&A) service of the IDP 102, at 510, whereby the IDP 102 determines whether the credential is sufficient to satisfy the needs of the relying party 112. For example, the relying party 112 may be enrolled with the IDP 102 for specific access, services, and/or interactions, whereby the IDP 102 is aware of the type of data necessary. For example, where the relying party 112 is a liquor store, the policy and assurance service may identify an age attribute (e.g., over 21 or not, etc.) as sufficient to satisfy the needs of the relying party 112. Here, the IDP 102 may determine that a particular credential is insufficient, from a content standpoint, or potentially from an assurance standpoint, as determined above. Regardless, the IDP 102 provides a response to the service call, whereby the mobile device 104, if appropriate, then proceeds. In particular, when appropriate, the mobile device 104 calls, at 512, the billing service of the IDP 102, whereby the IDP 102 generates a charge for the relying party 112 for use of the verifiable credential. When the billing service is confirmed and/or completed, the mobile device 104 retrieves the verifiable credential from memory and presents, at 514, the verifiable credential to the relying party 112.

In addition, the mobile device 104 calls, at 516, an audit service of the IDP 102, whereby an audit log entry is generated for the presentment of the credential to the relying party 112 (and the related interactions) (e.g., including the services called, time and date of the presentment, the credential presented, etc.).

At 518, the relying party 112 calls the issuer verification service of the IDP 102 to verify the issuer 108, for example, of the credential is valid. In this example, the relying party 112 may provide the credential, or an identifier associated with the credential sufficient to identify the issuer 108. The IDP 102 then confirms that the issuer 108 is a valid issuer with the IDP 102. Next, at 520, the relying party 112 retrieves the public key of the issuer 108, for example, and verifies, at 522, the verifiable credential from the mobile device 104 based on the public key. As above, the relying party 112 also calls, at 524, the audit service of the IDP 102, whereby an audit log entry is generated for the verifying of the verifiable credential (e.g., including the services called, issuer, time and date of the presentment, credential, etc.).

Finally, at 526, the relying party 112 indicates the verifiable credential is verified to the mobile device 104, and proceeds with interactions, as appropriate. In other words, the user 106 is verified, whereby the relying party 112 continues, for example, in business interactions (e.g., opening accounts, purchases, access requests, claims, etc.).

FIG. 6 illustrates another example method 600 for use in providing a verifiable (or self-sovereign) credential for the user 106 to the relying party 112. The example method 600 is described as implemented in system 100, with reference to the IDP 102, and with additional reference to the computing device 200. However, the methods herein should not be understood to be limited to the system 100 or the computing device 200, as the methods may be implemented in other systems and/or computing devices. Likewise, the systems and the computing devices herein should not be understood to be limited to the example method 600.

In connection with method 600, the user 106 desires to interact with the relying party 112, to take advantage of a service of the relying party 112. Consistent therewith, the user 106 requests, at 602, to access a service of the relying party 112. In response, the relying party 112 request a verified identity (ID) of the user 106, at 604. To provide the same, the user 106 selects, at 606, an ID option associated with the IDP 102 (e.g., from an interface, etc.). For example, the user 106 may select an option at a computing device (e.g., a kiosk, a terminal, etc.) associated with the relying party 112, etc. The selection of the option may include identification of certain information (e.g., identifying information, etc.) being provided to the relying party 112. For example, the user 106 may enter or otherwise provide a phone number, email address, or ID number, etc.

In turn, the relying party 112 submits, at 608, based on the interaction with the user 106, an ID request. The ID request may include, without limitation, an OIDC request, whereby the user 106 and/or the mobile device 104 is identifiable. The request (here and above) may be a security assertion markup language (SAML) request, or in other embodiments an API request (e.g., RESTful API, etc.), etc. It should be noted that by accepting requests in this manner, the IDP 102 may be compatible with conventional ID models, etc.

Upon receipt of the ID request, the IDP 102 identifies the user 106 and/or the mobile device 104, and directs, at 610, the user 106 to the application 116 of the mobile device 104. For example, the IDP 102 may provide a push notification (e.g., as banner, etc.), via the application 116, whereupon the user 106 clicks of the notification to open the application 116 to continue in method 600.

In connection therewith, the mobile device 104 requests, at 612, an authentication input from the user 106. The authentication input may include, without limitation, a passcode, a PIN, a biometric, etc. In turn, the user 106 provides, at 614, the authentication input to the mobile device 104, whereupon the mobile device 104 authenticates, at 616, the user 106 based on the authentication input relative to a reference included in the mobile device 104 (e.g., a biometric reference stored in memory 204, etc.). Next, the mobile device 104 requests, at 618, user consent to share identifying data, or more generally, a credential, with the relying party 112. At 620, the user 106 provides the consent input to the mobile device 104.

Based on the consent, the mobile device 104 retrieves the verifiable credential from memory and shares, at 622, the verifiable credential, along with an identifier of the issuer of the credential (e.g., issuer 108, etc.), potentially, with the IDP 102. The IDP 102 then requests, at 624, a public key for the issuer of the credential, from, the registry 120, and the registry 120 returns, at 626 the public key to the IDP 102. At 628, the IDP 102 verifies the credential with the public key. In response to the verification, the IDP 102 sends, at 630, a redirect URL to the mobile device 104, along with an authorization.

The mobile device 104 access, at 632, the URL, whereby the mobile device 104 is connected to the relying party 112. In doing so, the authorization is provided to the relying party 112. The relying party 102 the submits the authorization to the IDP 102, at 634, to retrieve the identifying data for the user 106 from the IDP 102. The IDP 102 identifies the specific identifying data based on the authorization and returns, at 636, the identifying data to the relying party 112.

In connection therewith, the relying party 112 is permitted to continue, at 638, with the user 106 in the interaction requested by the user 106 (e.g., access to the relying party service, etc.) based on the identifying data from the IDP 102.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the operations recited in the claims, such as, for example: (a) receiving an identity request from a relying party; (b) directing the identity request to a user of an application at a mobile device associated with the user, the mobile device including a verifiable credential; (c) receiving, from the mobile device, the verifiable credential; (d) verifying the verifiable credential based on a public key associated with an issuer of the verifiable credential; (e) transmitting a first authorization of the verifiable credential to the relying party; (f) receiving a request for identity data from the relying party, the identity data request including a second authorization relating to the verifiable credential; (g) in response to the first authorization matching the second authorization, returning the identity data to the relying party; (h) creating a verifiable credential, based on a credential provided by a user, wherein the credential provided by the user is verified as the verifiable credential; and/or (i) issuing the verifiable credential to a mobile device associated with the user, whereby the verifiable credential is stored in memory of the mobile device and usable to identify the user.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in providing a verifiable credential to a relying party, the method comprising:
    receiving, by an identity provider (IDP) computing device, an identity request from a relying party;
    directing, by the IDP computing device, the identity request to a user of an application at a mobile device associated with the user, the mobile device including a verifiable credential;
    receiving, by the IDP computing device, from the mobile device, the verifiable credential;
    verifying, by the IDP computing device, the verifiable credential based on a public key associated with an issuer of the verifiable credential;
    transmitting, by the IDP computing device, a first authorization of the verifiable credential to the relying party;
    receiving, by the IDP computing device, a request for identity data from the relying party, the identity data request including a second authorization relating to the verifiable credential; and
    in response to the first authorization matching the second authorization, returning the identity data to the relying party.

2. The computer-implemented method of claim 1, wherein the application includes an identity wallet application; and
    wherein the identity request includes one of: an open ID connect (OIDC) request, a security assertion markup language (SAML) request and a RESTful application programming interface (API) request.

3. The computer-implemented method of claim 1, wherein directing the request to the user of the application includes transmitting a push notification to the application.

4. The computer-implemented method of claim 1, wherein the verifiable credential includes one of a driver's license and a passport.

5. The computer-implemented method of claim 4, wherein verifying the verifiable credential includes:
    requesting the public key associated with the issuer from a registry;
    receiving, from the registry, the public key associated with the issuer of the verifiable credential; and
    verifying a signature of the verifiable credential based on the received public key.

6. A computer-implemented method for use in issuing a verifiable credential to a user, the method comprising:
    creating, by a first computing device associated with an issuer, a verifiable credential, based on a credential provided by a user, wherein the credential provided by the user is verified as the verifiable credential;
    signing, by the first computing device, the verifiable credential with a private key, prior to issuing the verifiable credential to a mobile device associated with the user; and
    issuing, by the first computing device, the verifiable credential to the mobile device associated with the user, whereby the verifiable credential is stored in memory of the mobile device and usable to identify the user;
    based on the verifiable credential being shared from the mobile device, receiving, by a second computing device associated with a registry, from an identity provider (IDP), a request for a public key associated with the private key; and
    transmitting, by the second computing device, in response to the request, to the IDP, the public key associated with the issuer of the verifiable credential, whereby the IDP verifies the verifiable credential with the public key.

7. A non-transitory computer-readable storage medium comprising executable instructions, which when executed by at least one processor associated with an identity provider (IDP) computing device, cause the at least one processor to:
    receive an identity request from a relying party;
    direct the identity request to a user of an application at a mobile device associated with the user, the mobile device including a verifiable credential;
    receive, from the mobile device, the verifiable credential;
    verify the verifiable credential based on a public key associated with an issuer of the verifiable credential;
    transmit a first authorization of the verifiable credential to the relying party;
    receive a request for identity data from the relying party, the identity data request including a second authorization relating to the verifiable credential; and
    in response to the first authorization matching the second authorization, return the identity data to the relying party, whereby the relying party relies on the identity data for the user.

8. The non-transitory computer-readable storage medium of claim 7, wherein the identity request includes a RESTful application programming interface (API) request.

9. The non-transitory computer-readable storage medium of claim 7, wherein the identity request includes one of: an open ID connect (OIDC) request or a security assertion markup language (SAML) request.

10. The non-transitory computer-readable storage medium of claim 7, wherein the executable instructions, when executed by the at least one processor, further cause the at least one processor, in directing the request to the user of the application, to transmit a push notification to the application.

11. The non-transitory computer-readable storage medium of claim 10, wherein the application includes an identity wallet application.

12. The non-transitory computer-readable storage medium of claim 7, wherein the verifiable credential includes a driver's license.

13. The non-transitory computer-readable storage medium of claim 7, wherein the verifiable credential includes a passport.

14. The non-transitory computer-readable storage medium of claim 7, wherein the executable instructions, when executed by the at least one processor, further cause the at least one processor to:
- request the public key associated with the issuer from a registry;
- receive, from the registry, the public key associated with the issuer of the verifiable credential; and
- verify a signature of the verifiable credential based on the received public key, prior to verifying the verifiable credential.

\* \* \* \* \*